(12) United States Patent
Baggott et al.

(10) Patent No.: US 7,306,735 B2
(45) Date of Patent: Dec. 11, 2007

(54) PROCESS FOR THE REMOVAL OF CONTAMINANTS FROM WATER

(75) Inventors: Sean Baggott, Foothill Ranch, CA (US); Timothy W. Eggert, Seal Beach, CA (US); Chip Knight, Long Beach, CA (US)

(73) Assignee: General Electric Company, Fairfield, CT (US)

( * ) Notice: Subject to any disclaimer, the term of this patent is extended or adjusted under 35 U.S.C. 154(b) by 279 days.

(21) Appl. No.: 10/661,221

(22) Filed: Sep. 12, 2003

(65) Prior Publication Data

US 2005/0056590 A1    Mar. 17, 2005

(51) Int. Cl.
*B01D 61/04* (2006.01)
*B01D 61/10* (2006.01)

(52) U.S. Cl. .............. 210/637; 210/205; 210/259; 210/321.65; 210/335; 210/639; 210/641; 210/652; 210/806

(58) Field of Classification Search .............. 210/205, 210/206, 259, 321.65, 321.83, 335, 637, 210/639, 641, 652, 805, 806
See application file for complete search history.

(56) References Cited

U.S. PATENT DOCUMENTS

| | | | | |
|---|---|---|---|---|
| 4,495,031 A | * | 1/1985 | Breidenbach et al. | 201/28 |
| 4,574,049 A | | 3/1986 | Pittner | |
| 5,376,262 A | * | 12/1994 | Perry | 210/651 |
| 5,766,479 A | * | 6/1998 | Collentro et al. | 210/639 |
| 5,925,255 A | | 7/1999 | Mukhopadhyay | |
| 5,993,667 A | * | 11/1999 | Overman | 210/709 |
| 5,997,745 A | * | 12/1999 | Tonelli et al. | 210/652 |
| 6,054,050 A | * | 4/2000 | Dyke | 210/652 |
| 6,071,413 A | | 6/2000 | Dyke | |
| 6,506,306 B1 | * | 1/2003 | Hammer et al. | 210/652 |
| 7,186,344 B2 | * | 3/2007 | Hughes | 210/652 |

* cited by examiner

*Primary Examiner*—Joseph Drodge
(74) *Attorney, Agent, or Firm*—Hoffmann & Baron, LLP

(57) ABSTRACT

The present invention provides a method of removing contaminants from water which includes the steps of first providing a water feed exposed to at least one hydrocarbon or chemical process. This water feed is set in-line with a reverse osmosis system which includes an inlet, at least one reverse osmosis membrane, a permeate outlet, and a reject outlet. Then, pressure is applied to the water feed, or where the pressure of the water feed is higher than desired, the pressure is controlled or reduced. The pressure of the water feed serves to force the water feed through the reverse osmosis system. The reverse osmosis system then separates the water feed into a permeate and reject which includes at least one of the contaminants. The permeate is then directed to the permeate outlet and the reject is directed to the reject outlet.

33 Claims, 7 Drawing Sheets

PROCESS FOR THE REMOVAL OF CONTAMINANTS FROM WATER

FIELD OF THE INVENTION

The present invention relates to methods and apparatus for the removal of contaminants from water, particularly water which has been recovered from a variety of hydrocarbon and chemical processes. Particularly, contaminants including ammonia and amine, hydrogen sulfide, other sulfur acids, carbonate, and organic acids may be removed by the methods and apparatus of the present invention.

BACKGROUND OF THE RELATED TECHNOLOGY

In the fields of hydrocarbon and chemical processing, contaminants such as ammonia and amines, hydrogen sulfide, carbonate, other sulfur acids and organic acids can cause a variety of problems. For example, these contaminants can lead to corrosion and fouling of equipment, and an increase in toxic emissions.

Ammonia and amines are one example of a problematic contaminant. Ammonia and amines are formed from any nitrogen present in the crude, oil, or gas to be processed as well as nitrogen bearing compounds which may be introduced during the hydrocarbon and chemical processes. When ammonia is present in a steam system, it can lead to corrosion, particularly with copper metallurgy. Ammonia may also combine with chloride or carbonate to form solids which can plug flow lines and machinery.

Ammonia is produced in the refinery primarily in three processes, namely, hydrotreating, thermal cracking units and catalytic cracking units. In all processes, ammonia may be removed from the process gas by scrubbing with wash water. This wash water is often recycled into the hydrocarbon process where ammonia may cause additional corrosion, fouling and lead to $NO_x$ emission.

Removal of contaminants such as ammonia and hydrogen sulfide using generally accepted technology has required several steps and unit operations to achieve. Presently, application of contaminant removal unit operation has been limited due to capital and operational costs. Development of a simplified and economical method to remove these contaminants has not been achieved in the art.

Reverse osmosis (RO) technology has been used to treat water systems, typically for drinking water. U.S. Pat. No. 5,925,225 to Mukhopadhyay provides a method of treating water by raising the pH above 8.5 and passing it through a nanofiltration or reverse osmosis membrane. However, Mukhopadhyay does not treat water exposed to hydrocarbon or chemical processing which may include a greater concentration of contaminants, nor does Mukhopadhyay provide a method for the removal of ammonia.

U.S. Pat. No. 4,574,049 to Pittner also provides a water purification process that may include a reverse osmosis (RO) process. Pittner mainly addresses the use of RO membranes to remove carbon dioxide. Pittner accomplishes this by first raising the pH of the water feed to convert carbon dioxide to bicarbonate or preferably carbonate to increase the concentration that will be directed as reject. However, Pittner's method is similarly deficient as Mukhopadhyay's method in failing to address the additional concerns associated with hydrocarbon and chemical process waters, including failure to address the removal of ammonia.

Therefore, a need exists for a method of contaminant removal for process water which has been exposed to hydrocarbon and chemical processing. Desirably, this process will incorporate reverse osmosis technology and will be simplified, economical, and will accomplish removal of the contaminants present in this process water. More desirably, the result will be the reduction in corrosion and fouling of equipment and reduction in toxic emissions, especially when the processed water is recycled within the hydrocarbon process.

SUMMARY OF THE INVENTION

One aspect of the present invention provides a method of removing contaminants from water which includes the steps of first providing a water feed exposed to at least one hydrocarbon or chemical process. This water feed is set in-line with a reverse osmosis system which includes an inlet, at least one reverse osmosis membrane, a permeate outlet, and a reject outlet. Then, pressure is applied to the water feed, or where the pressure of the water feed is higher than desired, the pressure is controlled or reduced. The pressure of the water feed serves to force the water feed through the reverse osmosis system. The reverse osmosis system then separates the water feed into a permeate and reject which includes at least one of the contaminants. The permeate is then directed to the permeate outlet and the reject is directed to the reject outlet.

Another aspect of the present invention provides an apparatus for the removal of contaminants from process condensate including a water feed conduit connected to a water feed from one of hydrocarbon and chemical processing equipment and a reverse osmosis system including an inlet, at least one reverse osmosis membrane, a permeate outlet, and a reject outlet. Optionally, the apparatus may include a pre-treatment system upstream of the reverse osmosis system and either a pump or pressure control device to adjust the pressure of the water feed prior to contact with the reverse osmosis system.

A further aspect of the present invention provides a method for the removal of contaminants from water including the steps of:
(a) providing a water feed exposed to at least one hydrocarbon or chemical process;
(b) providing a first reverse osmosis system in-line with the water feed;
the reverse osmosis system comprising a first inlet, at least one reverse osmosis membrane, a first permeate outlet, and a first reject outlet;
(c) applying pressure or adjusting pressure of the water feed to a degree sufficient to force the water feed through the first reverse osmosis system and to effect a reverse osmosis process comprising separating the water feed into a first permeate and a first reject which includes at least one of the contaminants;
(d) directing the first permeate to the first permeate outlet;
(e) directing the first reject to the first reject outlet;
(f) providing a second reverse osmosis system downstream of the first permeate outlet, the second reverse osmosis system comprising a second inlet, at least one reverse osmosis membrane, a second permeate outlet, and a second reject outlet; wherein the first permeate outlet feeds into said second inlet;
(g) adjusting the pH of the first permeate prior to introduction of the first permeate to the second reverse osmosis system;
(h) applying pressure or adjusting pressure of the first permeate at the inlet of said second reverse osmosis system a degree sufficient to force the first permeate through the second reverse osmosis system to effect a second reverse osmosis process separating the first permeate into a second permeate and second reject which includes at least one of the contaminants.

A still further aspect of the invention provides a method for the removal of contaminants from water comprising a multi-stage reverse osmosis process comprising the following:

(a) completing the following steps of stage one:
   (i) providing a water feed exposed to at least one hydrocarbon or chemical process;
   (ii) providing a stage one reverse osmosis system in-line with the water feed; said stage one reverse osmosis system comprising a stage one inlet, at least one reverse osmosis membrane, a stage one permeate outlet, and a stage one reject outlet;
   (iii) applying pressure or adjusting pressure of the water feed to a degree sufficient to force the water feed through the stage one reverse osmosis system and to effect a reverse osmosis process comprising separating said water feed into a stage one permeate and a stage one reject which includes at least one of the contaminants;
   (iv) directing the stage one permeate to said the one permeate outlet; and
   (v) directing the stage one reject to the reject one outlet; and (b) completing at least one additional reverse osmosis process wherein a reject from a previous step is introduced to a reverse osmosis system of an immediately following subsequent step comprising the following steps:
   (i) providing a stage two reverse osmosis system downstream of the stage one reject outlet, the stage two reverse osmosis system comprising a stage two inlet, at least one reverse osmosis membrane, a stage two permeate outlet, and a stage two reject outlet; wherein the stage one reject outlet feeds into the stage two inlet;
   (ii) applying pressure or adjusting pressure of said stage one reject at the inlet of the stage two reverse osmosis system to a degree sufficient to force the stage one reject through the stage two reverse osmosis system to effect a second reverse osmosis process separating the stage one reject into a stage two permeate and a stage two reject which includes at least one of the contaminants; and (c) combining the stage one permeate and the stage two permeate.

DETAILED DESCRIPTION OF THE INVENTION

For the purposes of this invention, the term "ammonia" is meant to include all species of ammonia (i.e., $NH_3$ and $NH_4^+$). However, the term ammonia may also be used generically to include other nitrogen containing compounds, such as amines.

The term "organic acids" is meant to include organic acids which may be found as contaminants in process water exposed to either hydrocarbon or chemical processes. Specifically, organic acids will include lower alkyl organic acids such as formic and acetic acids.

The methods and apparatus of the present invention provide removal of contaminants present in process water, particularly waters that have been exposed to hydrocarbon and/or chemical processing. Many contaminants are excluded from process water by the methods of the present invention. Representative contaminants include ammonia, amines, hydrogen sulfide, other sulfur acids, carbonate, and organic acids. The advantages are numerous and include reduction of corrosion and fouling, reduction of toxic emissions including $NO_x$ emissions and allow the more efficient operation of processing equipment.

Sour water is normally associated with process water containing hydrogen sulfide. Sour water typically includes contaminants such as ammonia, amine, etc. There are many sources of sour water, such as water produced from condensing systems, and water collected for a water wash injection. To improve the quality of this sour water, such as by removing ammonia and amine, it can be used as wash water for the desalter with less deleterious effect caused by recycling ammonia and amine back into the process.

Within an oil refinery, there are several benefits to reducing the amount of contaminants such as ammonia, amines, organic acids which are present in process waters, as provided for by the present invention. Where water has been recycled to the crude unit via desalter wash water/overhead water wash, ammonia and amines which are present can lead to fouling and corrosion potential in the crude tower and overheads. By reducing the amount of ammonia and amines present in the recycled process water, by the methods of the present invention, the corrosion and fouling associated with the presence of ammonia and amine is reduced or eliminated which promotes an increase in the unit capacity and yield.

Figure 2:
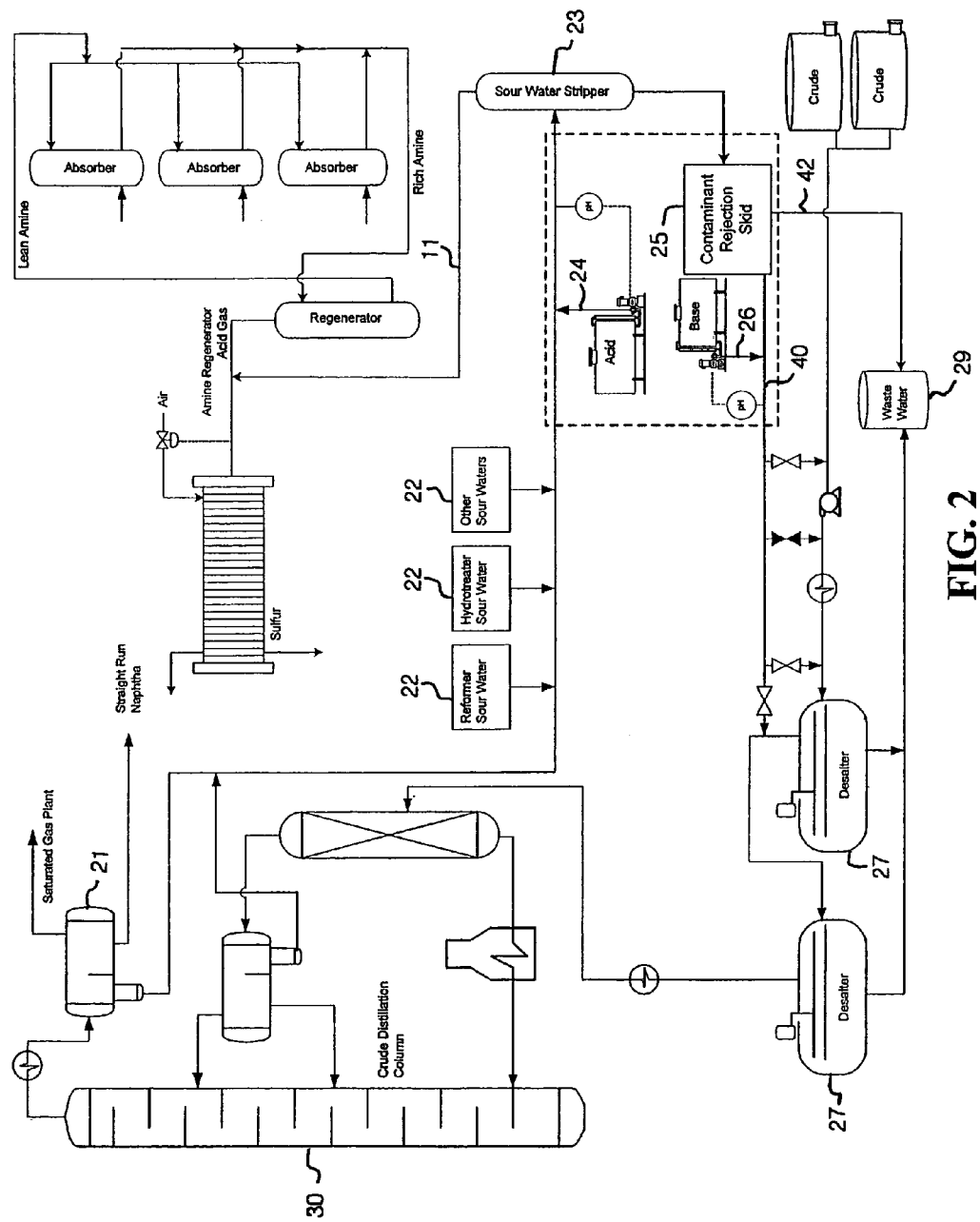
FIGS. 2-4 are schematic representations of oil refinery systems which include a reverse osmosis (RO) system as in the present invention to show examples of the placement of the RO system.

FIG. 2 depicts a refinery where water has been recycled to the crude distillation tower 30, via a desalter 27 and overhead accumulator 21. This diagram also shows treatment of the water prior to introduction to the desalter 27. Specifically, the water from the overhead accumulator 21, is combined with reformer sour water, hydrotreater sour water, and other sour waters 22, and routed to a sour water stripper 23. The present invention includes first optionally treating the sour waters with pH adjustment 24, treating the water at the sour water stripper 23, introducing the water to the reverse osmosis system 25, and then optionally making an additional adjustment to the pH 26. The reverse osmosis system 25 may include any of the RO systems as shown in FIGS. 5-9, and described below. After the treatment by the present invention, The permeate, directed through the permeate outlet 40, which subsequently has a lower level of contaminants is re-routed to the crude distillation tower 30, via the desalter 27. The reject, directed through the reject outlet 42, is directed toward waste water treatment 29.

Figure 3:
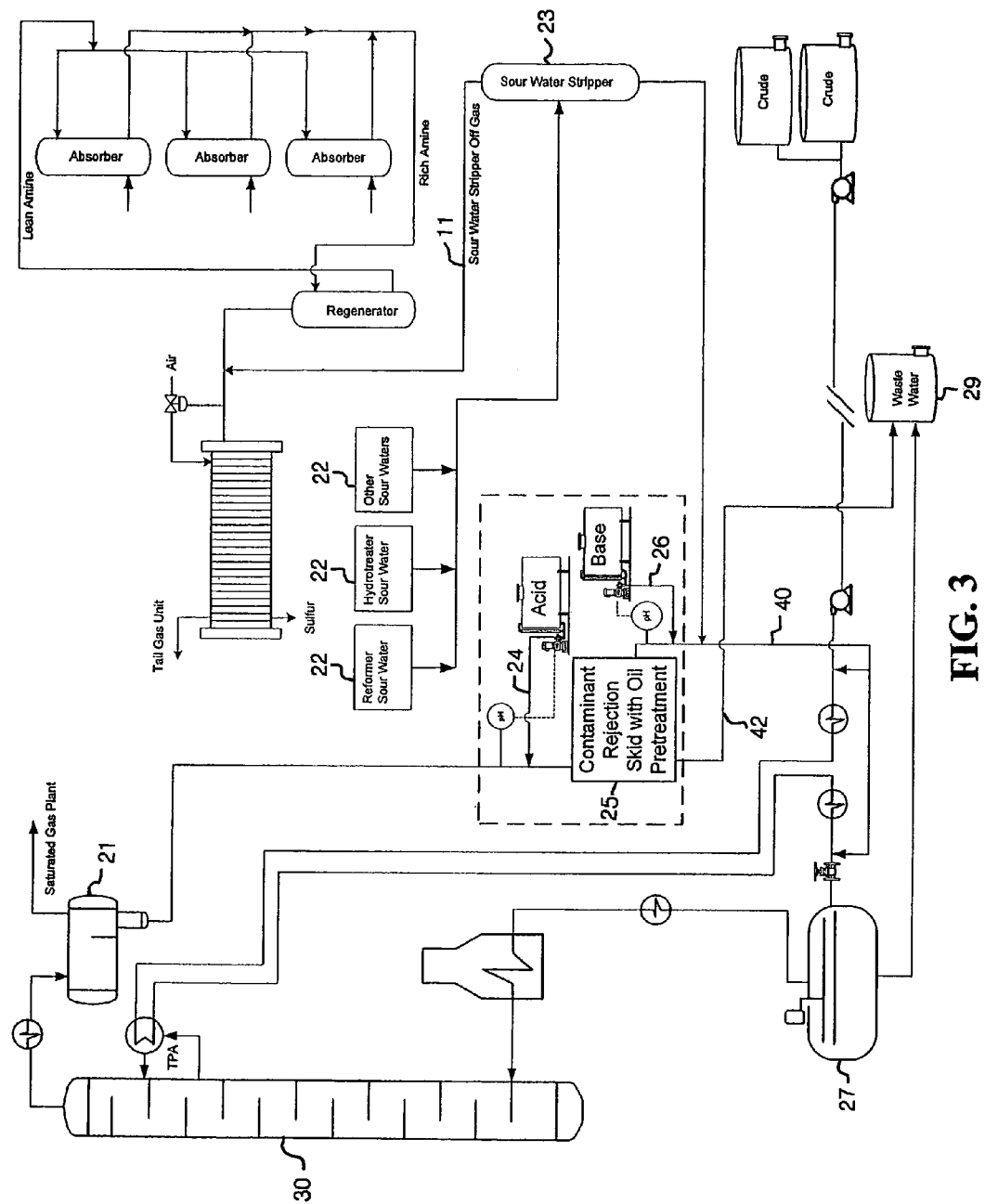
Figure 4:
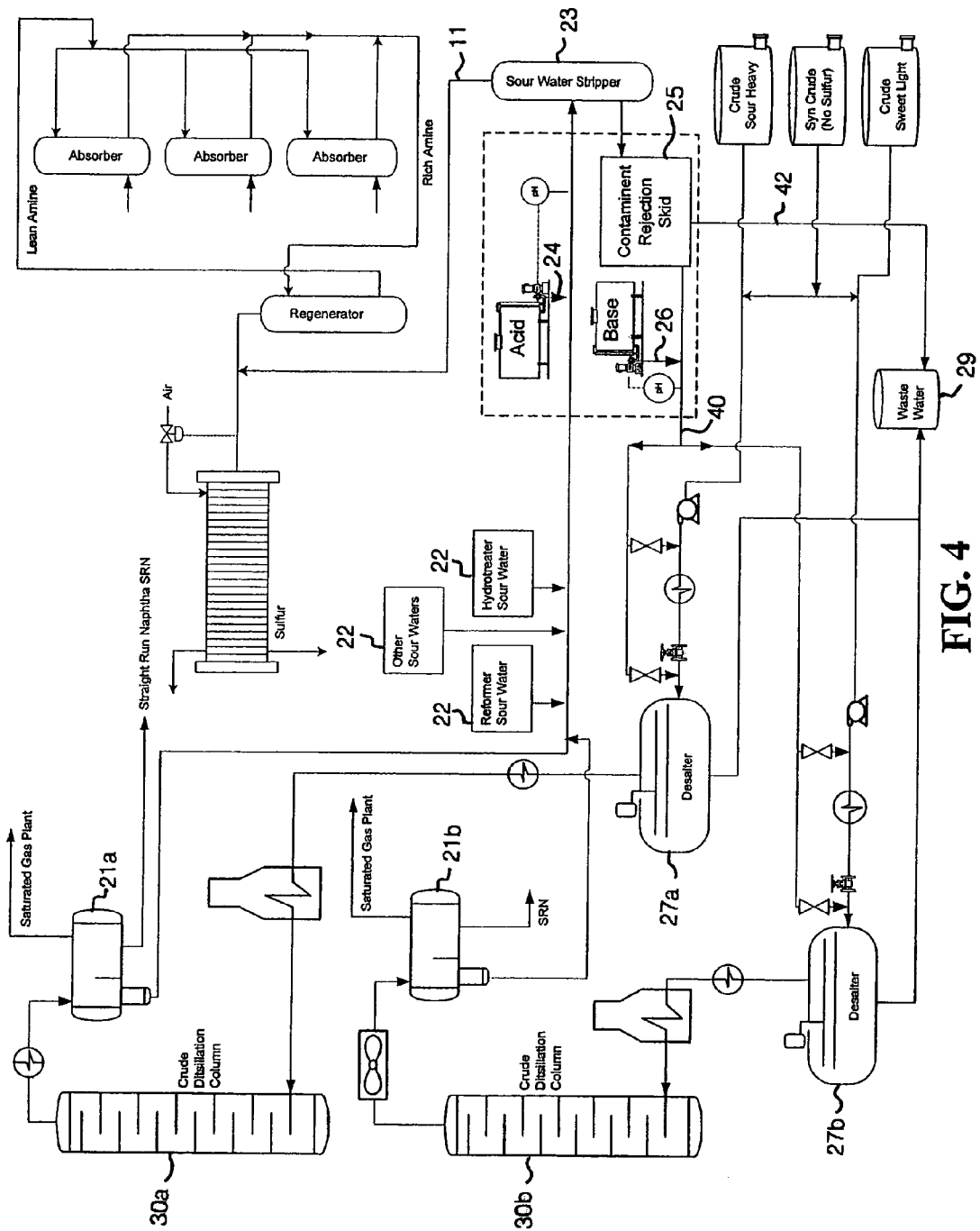

FIGS. 3 and 4 are additional examples of placement of a reverse osmosis (RO) system 25 within a refinery. In FIG. 3, water is routed from the overhead accumulator 21, to the reverse osmosis system 25, which may include a pre-treatment system such as microfiltration, nanofiltration, or ultrafiltration. The reverse osmosis system 25 may include any of the RO systems as shown in FIGS. 5-9, and described below. This may optionally include pre-treatment pH adjustment 24 and post-treatment pH adjustment 26. The permeate, directed through the permeate outlet 40, is then combined with the water treated from the sour water stripper 23 and routed to a desalter 27 and back to the crude distillation tower 30. The reject, directed through the reject outlet 42, is directed toward waste water treatment 29.

In FIG. 4, similar to FIG. 2, the water from the overhead accumulators 21a and 21b, is combined with reformer sour water, hydrotreater sour water and other sour waters 22. This water is then routed to the sour water stripper 23 and to the reverse osmosis system 25. The reverse osmosis system 25 may include any of the RO systems as shown in FIGS. 5-9, and described below. This may optionally include pre-treatment pH adjustment 24 and post-treatment pH adjustment 26. The permeate, directed through the permeate outlet 40, is then routed to one of two desalters 27a and 27b and back to the crude distillation towers 30a and 30b. The reject, directed through the reject outlet 42, is directed toward waste water treatment 29.

The application of the invention to reduce ammonia and amine provides other benefits. For example, where the acid gas from the top of the sour water stripper is routed to a sulfur plant for treatment, the presence of ammonia and amine in the acid gas, reduces the capacity of the sulfur plant. Reducing the ammonia and amine in the acid gas increases the capacity of the sulfur plant to process additional sulfur. This allows the refinery to increase the level of sulfur coming into the refinery, via the crude, as the net capacity to handle that sulfur has been increased by the application of the invention. Additionally this will reduce the ammonia that goes into the sulfur plant. It is typical to find a Claus reactor as the first step of a sulfur plant. Since the Claus reactor will oxidize most of the ammonia to $NO_x$, the removal of the ammonia at this stage will reduce the $NO_x$ emissions from the refinery.

Figure 1:
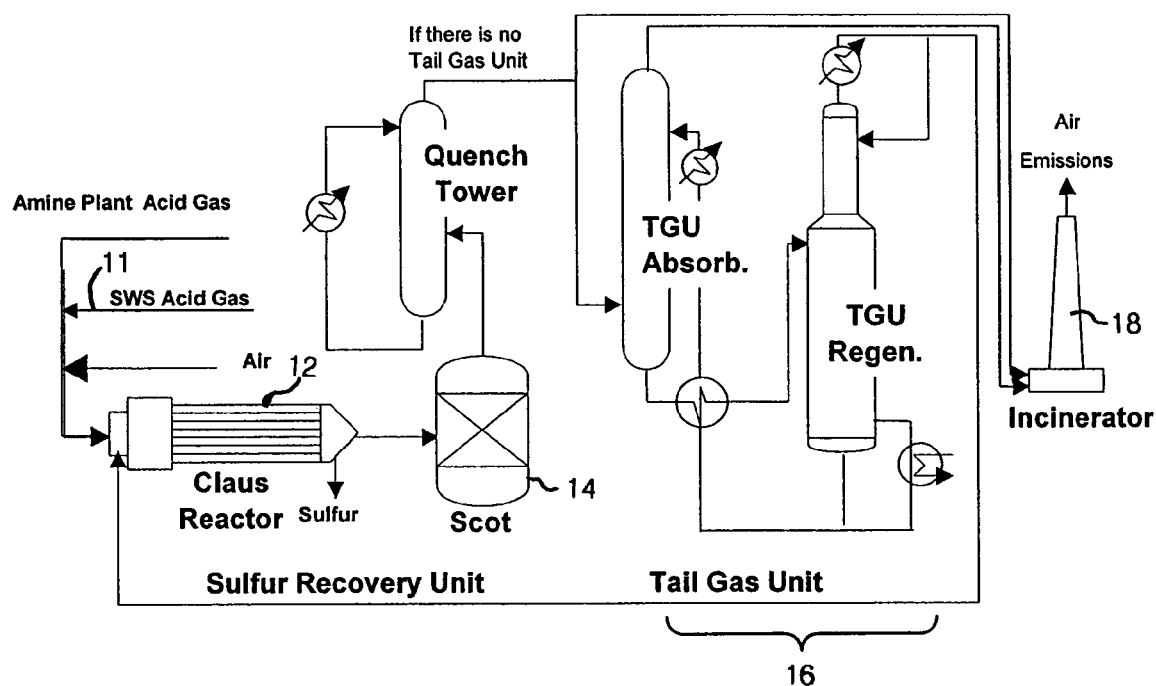
FIG. 1 is a schematic representation of a sulfur plant.

FIG. 1 is an elaborate depiction of a sulfur plant which includes a Claus reactor 12, a Scot reactor 14, and a tail gas unit 16. A reverse osmosis system as shown in FIGS. 5-9 and described in more detail below, may be placed in-line and upstream of the entrance of the sour water stripper acid gas 11. This will result in a lower concentration of contaminants, particularly ammonia being introduced to the sulfur plant and fewer $NO_x$ emissions released to the atmosphere from the incinerator 18.

Removal of contaminants in the present invention also provides for improved quality of water wash utilized in wet sour systems. This is relevant where the potential for carbonate cracking exists. Carbonate cracking is an intra granular cracking corrosion, promoted by the presence of carbonates. Wash water of a pH of >9.5 is normally required to have sufficient levels of carbonate in the system to initiate this type of corrosion. In the absence of high levels of hydrogen sulfide (i.e., in a catalytic cracking unit that has a hydrotreated feed), the high pH can be generated with high levels of ammonia. If a slip stream of the wash water was treated through the methods and apparatus of the present invention and recycled through the loop, the quality of the bulk wash water can be controlled. This would reduce or prevent the potential for carbonate cracking.

In many wash water operations the source of wash water is stripped sour water. Sour water stripper bottoms is the predominate source of stripped sour water. It is common that a quality constraint on the use of stripped sour water is the presence of contaminants, including ammonia and amines. The contaminants may then be removed by the reverse osmosis process of the present invention. It is possible to configure the operating conditions of the sour water stripper to preferentially strip hydrogen sulfide as opposed to ammonia and amines. This increases the removal efficiency of hydrogen sulfide but decreases the removal efficiency of ammonia. The application of the invention on the stripped sour water bottoms will then remove the ammonia and amines such that the net effect is that the removal efficiency of both hydrogen sulfide and ammonia is increased.

The reverse osmosis methods and accompanying apparatus of the present invention may include pre-treatment, post-treatment and intermediate systems which include, but are not limited to, additional systems of filtration and pH adjustment. Additional filtration systems will generally be part of a pre-treatment system, but the pH adjustment may be performed at any step prior or subsequent to filtration, deaearation, sour water stripping, or reverse osmosis, i.e., as a pre-treatment, post-treatment and/or intermediate system.

Treatment by Reverse Osmosis (RO)

Figure 6:
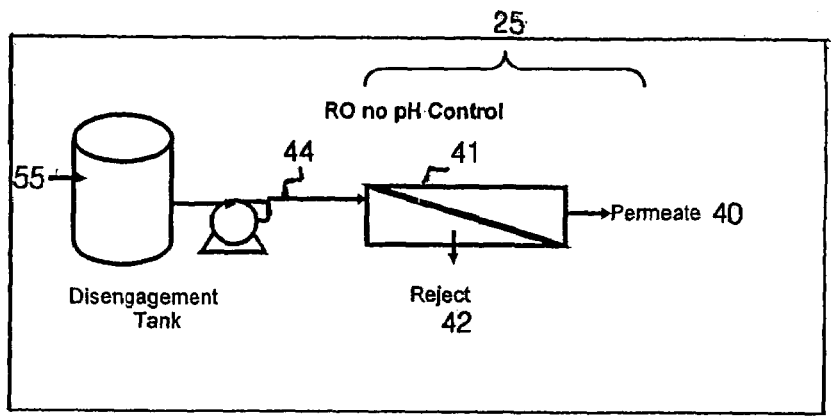

The treatment process begins with providing a water feed which has been exposed to hydrocarbon and/or chemical processing. For example, this may include wash water and stripped sour water as described above, as well as process condensate from a steam/methane reformer. The pressure of the water feed is adjusted to the desired pressure by increasing with the use of a pump or decreasing with a pressure control device or pressure regulator as needed in order for the water feed to pass through the reverse osmosis (RO) system. As shown in FIG. 6, the RO system 25 includes an inlet 44, at least one reverse osmosis membrane 41, a permeate outlet 40 and a reject outlet 42. Desirably, the water feed travels from the hydrocarbon or chemical processing equipment via a conduit which enters the RO system inlet. This will optionally included a disengagement tank 55. The RO system separates the water feed into permeate and reject which are subsequently directed to the permeate outlet 40 and the reject outlet 42, respectively.

Figure 7:
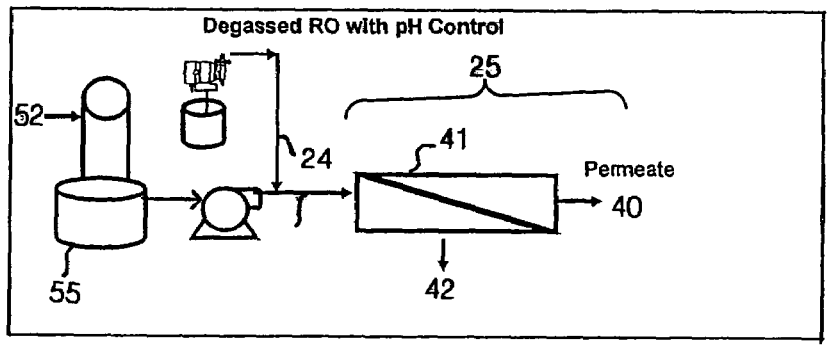

An RO membrane will serve to separate molecular species, particularly, ionic species from a given water feed. Therefore, pH adjustment may be conducted to increase the amount of a specific molecular species which will be directed to the reject. For example an increase in pH, i.e., by the addition of a strong base, will promote the rejection of an acidic species. On the other hand, a decrease in pH, i.e., by the addition of a strong acid, will promote the rejection of a basic species. As shown in FIG. 7, the pH adjustment or injection 24 may be prior to introduction of the water feed to the RO membrane 41.

A variety of different RO membranes are compatible with the methods and apparatus of the present invention. Desirably, the membrane will be a thin-film composite membrane. More desirably, the membrane will be a spiral wound thin-film composite membrane, such as the S series thin-film composite membrane, available from GE Osmonics. The membrane must be able to withstand the desired process parameters. Desirably, the pressure may range from 5 psig to about 300 psig and the temperature may range from about 60° F. to about 185° F.

The RO process may include either or both of a multi-step process or a multi-stage process, which includes the use of more than one RO system, with optional adjustments made between passes of the RO systems.

Figure 8:
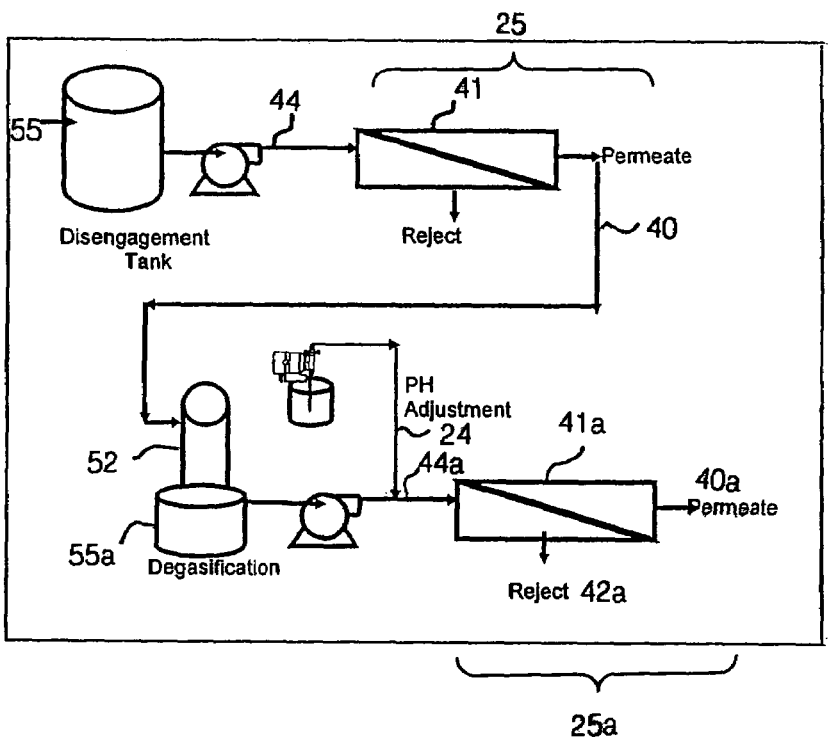

The multi-step process is meant to include the use of more than one RO system wherein the permeate of an upstream RO system is introduced to the inlet of an additional RO system. An example of a multi-step process is shown in FIG. 8. This design is to promote the removal of a greater variety of contaminants. This is accomplished by adjusting the pH, by acid or base injection 24 to the permeate outlet 40, before the permeate enters the additional RO system 25a. In order to control the adjustment of the pH, an optional break tank 55a may be provided for the permeate of the first RO system 25. The pressure of the permeate may then also be adjusted prior to introduction to the additional RO system 25a. Another optional break tank 55 may also be provided upstream of the first RO system 25 to adjust pH as desired (depending on the contaminant to be removed) and to release dissolved gases. With this apparatus, an initial lower pH may be selected for removal of ammonia by the first RO system 25, then after an increase in pH and subsequent introduction to the additional RO system 25a, additional organic acids can be removed. After the multi-step process is complete, the permeate may be recycled into the hydrocarbon or chemical process, especially as wash water and the rejects of each step may be combined and directed to a waste treatment plant.

Figure 9:
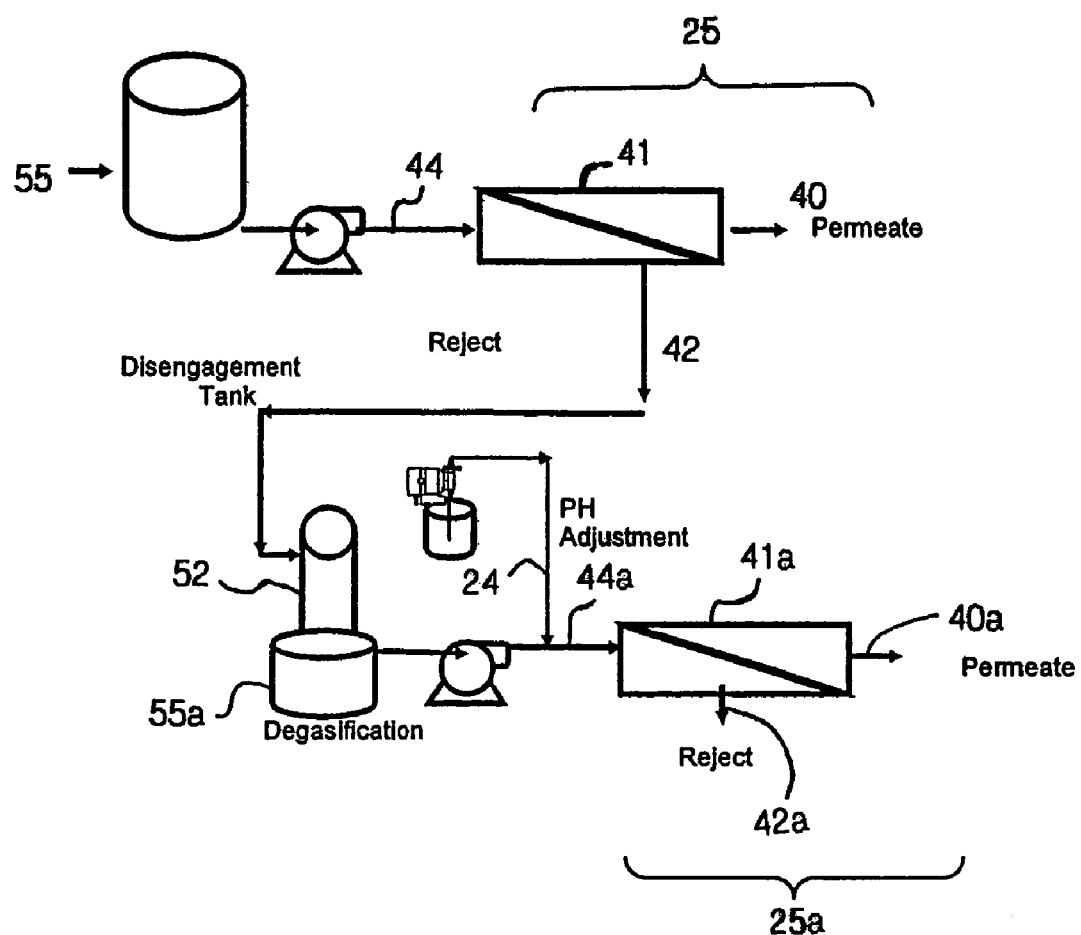

A multi-stage process is meant to include the use of more than one RO system wherein the reject of an upstream RO system is introduced to the inlet of an additional RO system. This design is to promote a greater recovery of the permeate. An example of a multi-stage process is shown in FIG. 9. Adjustment of the pH is optional for this process, but where desired, a break tank 55a may be provided to aid in control of the pH and pressure of the reject from the reject outlet 42 which is fed into the inlet 44a of the additional RO system 25a. After completion of the multi-stage process, the permeates may be combined and recycled as in the multi-step process, and the reject may be directed to a waste water treatment facility.

Any combination of multi-stage and multi-step processes may be combined depending on which contaminants are to be removed, the desired concentration of contaminants to be removed, and the desired ratio of volume of permeate to reject. While the efficiency of contaminant removal may vary, the methods of the present invention may achieve a concentration of contaminants in the permeate which is approximately 80% to about 100% less than that of the water feed.

Any of the RO systems contemplated by the present invention may include pre-treatment systems (meaning additional water treatment upstream of RO treatment) and post-treatment system (meaning additional water treatment downstream of RO treatment), including the single step, the multi-step and the multi-stage systems, as well as combinations, thereof. However, a particular post-treatment system may be downstream of a first RO system and upstream of a second RO system. This includes treatment for the adjustment of pH as described above.

Pre-treatment systems that include filters are useful where the water feed will include solids or oils. This is meant to include particles which are not miscible with or dissolve in water at the process temperature and pressure. These particles may be removed by means of a any filter known in the art. Pre-treatment filters may include at least one of nanofiltration, microfiltration, ultrafiltration and activated carbon.

A deaerator may also be added as a pre-treatment system. This system will help to remove dissolved gasses. For example, $CO_2$ may be removed by a deaerator where the pH is sufficient to keep $CO_2$ in its dissolved gas form. For this reason pH adjustment may also be incorporated as a pre-treatment to sufficiently lower the pH to maintain $CO_2$ in its dissolved gas form prior to introduction to the deaerator.

A sour water stripper may also be included as a pre-treatment system. For this system, pH adjustment may also be desired to encourage additional removal of hydrogen sulfide.

The features and advantages of the present invention are more fully shown by the following examples which are provided for purposes of illustration, and are not to be construed as limiting the invention in any way.

EXAMPLES

Figure 5:
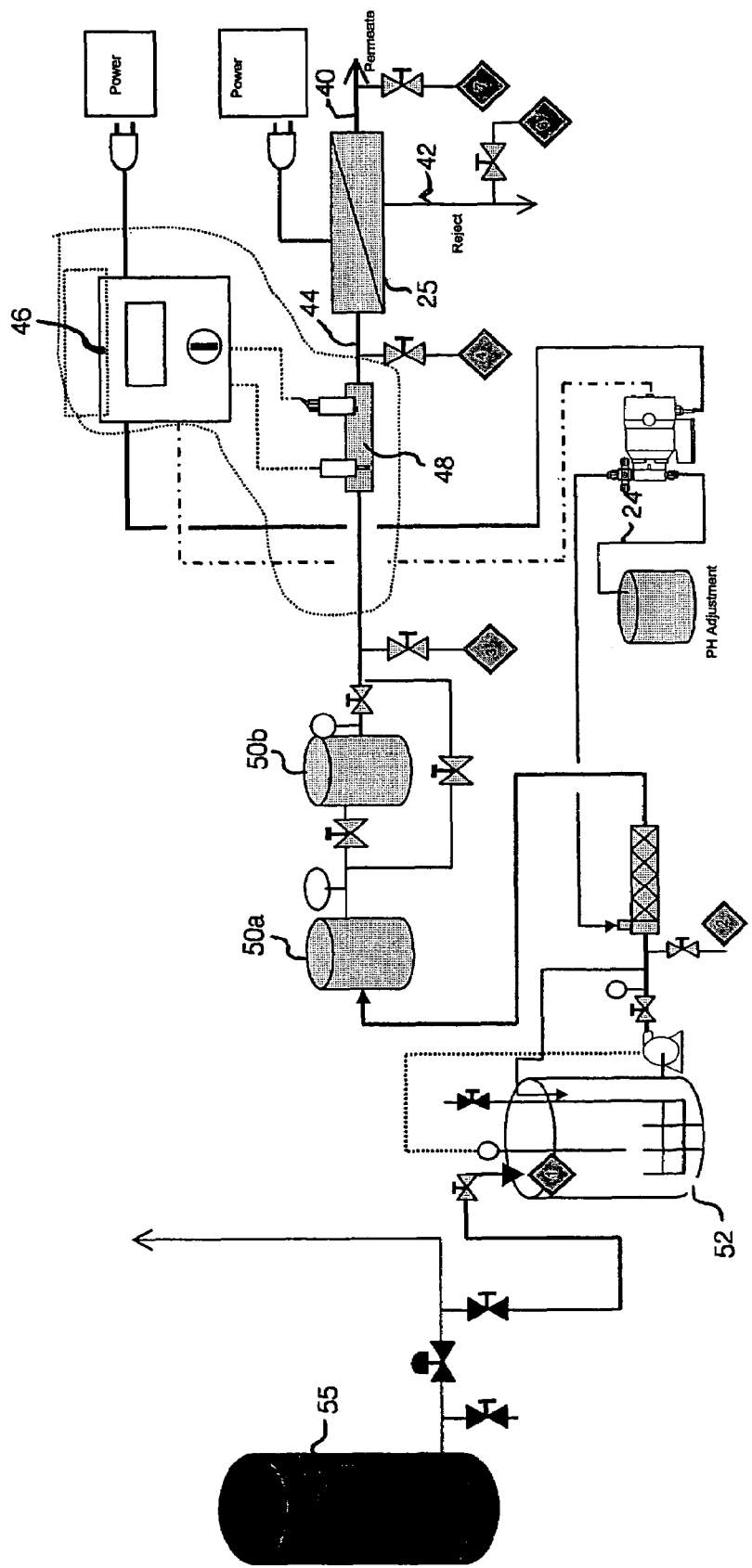
FIGS. 5-9 are schematic representations of the reverse osmosis systems of the present invention which may be included as the reverse osmosis systems generally depicted in FIGS. 2-4.

Examples 1-10 were conducted using the apparatus of FIG. 5. The process water was first collected in a storage tank 55 and then fed through the system. The apparatus includes a degasification tank 52, additional pre-treatment systems 50a and 50b, and a reverse osmosis system 25 having an inlet 44, a permeate outlet 40 and a reject outlet 42. The pretreatment systems included microfiltration, carbon filtration, and pH adjustment 24. A combination of the different pre-treatment systems was operated under different examples to demonstrate the result of each different treatment. The pH adjustment system included a pH monitor 46. Where desired, the pH monitor 46 measured the pH of the water which was directed to a break tank 48. The pH monitor 46 was connected by a feedback loop to introduce either a strong acid or strong base to the water feed to adjust the pH. The pH, level of contaminants, and pressure of the water feed was measured at various points as shown in Tables 1-10. The sample points are indicated in diamonds in FIG. 5 with numbers that correspond to the parameters as set forth in Tables 1-10, below.

Each of the Examples 1-11 was an individual test which was conducted under the parameters as set forth below.

Example 1

The water feed was first degasified then fed through the reverse osmosis (RO) system. There was no pH adjustment, the carbon filter was not used, and the target recovery was 50%. As shown in Table 1, this example demonstrates that, even without pH adjustment, ammonia and organic acids were removed. The ammonia concentration decreased from 155 ppm to 6.1 ppm which is a 96% decrease. Organic acids were decreased from 16.7 ppm to 2.4 ppm.

TABLE 1

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.7 | 5.9 | 5.9 | | 7.6 | 4.8 | |
| Lab pH | units | 6.6 | 7.5 | 7.6 | | 7.6 | 6.2 | |
| Sodium | ppm as Na | 0.0 | 0.0 | 0.0 | | 0.2 | 0.0 | |
| Free Ammonia | ppm as N | 107.0 | 109.0 | 107.0 | | 190.0 | 5.4 | 95% |

TABLE 1-continued

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Fixed Organic Ammonia | ppm as N | 48.0 | 24.0 | 19.7 | | 21.0 | 0.7 | 96% |
| Total Ammonia | ppm as N | 155.0 | 133.0 | 19.7 | | 21.0 | 0.7 | 96% |
| Acetic Acid | ppm as $C_2HO_2$ | 8.7 | 8.7 | 8.8 | | 27.0 | 1.4 | 84% |
| Formic Acid | ppm as $CH_2O_2$ | 8.0 | 7.9 | 8.0 | | 12.4 | 1.0 | 88% |
| Pressure | psig | 110.0 | | | 160.0 | 140.0 | | |

Example 2

Similar to Example 1, the water feed in Example 2 was first degasified. Then the pH was monitored and caustic was injected to achieve a pH of 9.0. Carbon filtration was not included and the target recovery was 50%.

The results of this test are shown in Table 2. While the ammonia removal was not as efficient at the elevated pH (9.0), a 66.67% removal of ammonia was demonstrated. The elevated pH in this example did achieve an enhance removal of organic acids, from 15.1 ppm in the process water to 0.3 ppm in the RO permeate, approximately 98% rejection of organic acids.

TABLE 2

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.6 | 6.6 | 9.0 | | 8.6 | 10.2 | |
| Lab pH | units | 6.0 | 7.3 | 8.8 | | 8.6 | 9.8 | |
| Sodium | ppm as Na | 0.0 | 0.0 | 116.0 | | 235.0 | 6.0 | 95% |
| Free Ammonia | ppm as N | 71.0 | 70.0 | 68.0 | | 107.0 | 26.0 | 62% |
| Fixed Organic Ammonia | ppm as N | 19.3 | 21.0 | 22.0 | | 46.0 | 4.3 | 80% |
| Total Ammonia | ppm as N | 90.0 | 91.0 | 90.0 | | 153.0 | 30.3 | 66% |
| Acetic Acid | ppm as $C_2HO_2$ | 6.8 | 6.9 | 7.0 | | 16.0 | 0.1 | 99% |
| Formic Acid | ppm as $CH_2O_2$ | 8.3 | 8.4 | 8.4 | | 16.4 | 0.2 | 98% |
| Pressure | psig | 30.0 | | | 140.0 | 122.0 | | |

Example 3

This example was conducted similarly to Example 1. Specifically, the process condensate was degasified, but there was no pH adjustment, no carbon filtration, and the target recovery was 50%. As shown in Table 3, the results were comparable to those demonstrated by Example 1. Ammonia concentration was reduced by 95% from 140 ppm to 6.7 ppm in the permeate.

TABLE 3

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.6 | 6.5 | 6.5 | | 6.9 | 5.1 | |
| Lab pH | units | 6.1 | 6.9 | 7.0 | | 7.3 | 5.7 | |
| Sodium | ppm as Na | 0.0 | 0.0 | 0.0 | | 0.0 | 0.0 | 85% |

TABLE 3-continued

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Free Ammonia | ppm as N | 140.0 | 130.0 | 139.0 | | 258.0 | 5.7 | 96% |
| Fixed Organic Ammonia | ppm as N | 6.0 | 6.0 | 9.0 | | 14.0 | 1.0 | 89% |
| Total Ammonia | ppm as N | 140.0 | 142.0 | 151.0 | | 272.0 | 6.7 | 96% |
| Acetic Acid | ppm as $C_2HO_2$ | 9.6 | 9.6 | 9.7 | | 19.1 | 1.0 | 90% |
| Formic Acid | ppm as $CH_2O_2$ | 8.1 | 8.2 | 8.2 | | 15.0 | 1.0 | 88% |
| Pressure | psig | 30.0 | | | 150.0 | 131.0 | | |

Example 4

The target pH for Example 4 was 7, but proved to be difficult to maintain even with the caustic injection. The pH as measured in the field after pH adjustment was approximately 7.5. The process condensate was first degasified, but no carbon filtration was used and the target recovery was 50%. The results are shown in Table 4.

The RO process at this pH effectively removed both ammonia and organic acids. Specifically, The combined free and fixed ammonia was removed by 95.8%. The untreated process condensate ammonia was 136 ppm which dropped to 5.7 ppm in the permeate. A similar removal was noted for the organic acids. Specifically, a 95% reduction from 21.9 ppm in the process condensate to 1.0 ppm in the RO permeate.

Example 5

The target pH for example 5 was 8.5, which was achieved through caustic injection. The process condensate was first degasified and then a caustic injection was added. A carbon filter was not used and the target recovery was 50%. The results are shown in Table 5.

The example also demonstrates the removal of ammonia and organic acids. Ammonia concentration was reduced from 261 ppm in the process condensate to 33 ppm in the permeate, an 87.4% reduction. Organic acids were removed more effectively than the ammonia. The organic acid removal was at 98.4%, from 18.6 ppm to 0.3 ppm.

TABLE 4

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.7 | 6.5 | 7.5 | | 7.5 | 5.6 | |
| Lab pH | units | 6.2 | 7.0 | 7.7 | | 7.8 | 6.4 | |
| Sodium | ppm as Na | 0.0 | 0.1 | 107.0 | | 219.0 | 3.4 | 97% |
| Free Ammonia | ppm as N | 136.0 | 148.0 | 138.0 | | 301.0 | 5.7 | 96% |
| Fixed Organic Ammonia | ppm as N | 2.0 | 3.0 | 6.0 | | 0.0 | 0.4 | 93% |
| Total Ammonia | ppm as N | 138.0 | 152.0 | 144.0 | | 301.0 | 6.1 | 96% |
| Acetic Acid | ppm as $C_2HO_2$ | 12.2 | 11.8 | 12.0 | | 24.0 | 0.4 | 97% |
| Formic Acid | ppm as $CH_2O_2$ | 9.7 | 9.6 | 9.7 | | 18.7 | 0.6 | 94% |
| Pressure | psig | 30.0 | | | 135.0 | 116.0 | | |

TABLE 5

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.8 | 6.9 | 8.6 | | 8.3 | 9.8 | |
| Lab pH | units | 6.1 | 7.2 | 8.8 | | 8.5 | 9.9 | |
| Sodium | ppm as Na | 0.0 | 0.0 | 115.0 | | 263.0 | 5.2 | 95% |
| Free Ammonia | ppm as N | 146.0 | 142.0 | 140.0 | | 82.0 | 33.0 | 76% |
| Fixed Organic Ammonia | ppm as N | 118.0 | 31.0 | 0.0 | | 99.0 | 0.0 | |
| Total Ammonia | ppm as N | 261.0 | 173.0 | 140.0 | | 181.0 | 33.0 | 76% |
| Acetic Acid | ppm as $C_2HO_2$ | 10.1 | 10.6 | 10.5 | | 26.0 | 0.1 | 99% |
| Formic Acid | ppm as $CH_2O_2$ | 8.5 | 8.8 | 8.8 | | 18.1 | 0.3 | 97% |
| Pressure | psig | 30.0 | | | 135.00 | 116.0 | | |

Example 6

A target pH of 9.5 was used in this example. Water was first degasified and then caustic injection added for pH adjustment. No carbon filtration was used and the target recovery was 50%. The results are shown in Table 6.

At this elevated pH, significantly less ammonia was removed than in the previous examples. Ammonida was removed by 57% from 86 ppm to 37 ppm in the permeate. However, nearly all organic acid was removed. The organic acid concentration was 20.7 ppm in the process condensate, but was below a detectable level in the permeate.

Example 7

Water was first degasified and then injected with caustic to achieve a pH of 10. The carbon filtration was not used in this example and the target recovery was 50%. The results are shown in Table 7.

After caustic injection, the pH, as tested in the field was 10.3. At this pH, there was a notable reduction in the ammonia removed as opposed to example 6, which had a target pH of 9.5. The organic acid removal was approximately 100%, a reduction from 16.7 ppm to below detectable levels.

TABLE 6

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.7 | 6.5 | 9.6 | | 9.4 | 10.4 | |
| Lab pH | units | 6.0 | 6.9 | 9.5 | | 9.5 | 10.4 | |
| Sodium | ppm as Na | 0.0 | 0.0 | 323.0 | | 616.0 | 23.0 | 93% |
| Free Ammonia | ppm as N | 46.0 | | 32.0 | | 105.0 | 5.8 | 82% |
| Fixed Organic Ammonia | ppm as N | 40.0 | | 51.0 | | 385.0 | 31.0 | 39% |
| Total Ammonia | ppm as N | 86.0 | | 83.0 | | 490.0 | 36.8 | 56% |
| Acetic Acid | ppm as $C_2HO_2$ | 11.0 | 10.9 | 11.1 | | 22.0 | 0.1 | 99% |
| Formic Acid | ppm as $CH_2O_2$ | 9.7 | 9.6 | 9.6 | | 19.4 | 0.1 | 99% |
| Pressure | psig | 0.0 | | | 135.0 | 113.0 | | |

TABLE 7

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.9 | 6.5 | 10.5 | | 10.1 | 10.8 | |
| Lab pH | units | 6.4 | 6.7 | 10.3 | | 10.0 | 11.3 | |
| Sodium | ppm as Na | 0.0 | 0.1 | 570.0 | | 1280.0 | 65.0 | 89% |
| Free Ammonia | ppm as N | 111.0 | 112.0 | 113.0 | | 140.0 | 84.0 | 26% |
| Fixed Organic Ammonia | ppm as N | 0.0 | 10.0 | 0.0 | | 0.0 | 0.0 | |
| Total Ammonia | ppm as N | 111.0 | 122.0 | 113.0 | | 140.0 | 84.0 | 26% |
| Acetic Acid | ppm as $C_2HO_2$ | 8.1 | 8.4 | 8.3 | | 18.8 | 0.0 | 100% |
| Formic Acid | ppm as $CH_2O_2$ | 8.6 | 8.7 | 8.7 | | 18.9 | 0.2 | 98% |
| Pressure | psig | 35.0 | | | 120.0 | 110.0 | | |

Example 8

This example did not use a caustic injection or the carbon filtration. The flow was modified to achieve 90% recovery to test for physical limitations to running at high efficiency. The water was degasified, but included no pH adjustment and no carbon filtration.

No physical or mechanical problems were noted at this recovery level, as is shown by Table 8. The ammonia and organic acid removal was at 90% which was similar to the tests conducted at 50% recovery. The ammonia was removed by 93.7% from 117 ppm to 7.4 ppm in the permeate. The organic acids were removed by 84.3% from 18.5 ppm to 2.9 ppm.

of degasification and the RO system. No pH adjustment was conducted. The unit was run first without a carbon bed to establish the "blank test" and then permeate was sent through the carbon bed.

The carbon was not found to have a significant effect on the process condensate. For the blank test comparing the degasified process condensate to the permeate, combined free and fixed ammonia was removed by 90.3%. The degasified process condensate ammonia was 94 ppm which dropped to 9.1 ppm in the permeate. The organic acids were reduced to 3.5 ppm in the RO permeate from 18.3 ppm, an 80.9% reduction.

With the carbon bed, the ammonia was removed by 90.7%, from 83 ppm to 7.7 ppm in the permeate. After the

TABLE 8

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.6 | 6.4 | 6.6 | | 7.2 | 5.2 | |
| Lab pH | units | | | 6.9 | | 8.0 | 5.7 | |
| Sodium | ppm as Na | | | 0.0 | | 0.1 | 0.0 | 50% |
| Free Ammonia | ppm as N | | | 117.0 | | | 6.8 | 94% |
| Fixed Organic Ammonia | ppm as N | | | 0.3 | | | 0.6 | −100% |
| Total Ammonia | ppm as N | | | 117.3 | | | 7.4 | 94% |
| Acetic Acid | ppm as $C_2HO_2$ | | | 9.9 | | | 1.6 | 84% |
| Formic Acid | ppm as $CH_2O_2$ | | | 8.6 | | | 1.3 | 85% |
| Pressure | psig | 30.0 | | | 152.0 | 137.0 | | |

Example 9

In this example, the results of which are shown in Table 9, the permeate was run through a carbon bed downstream carbon bed, 10.3 ppm ammonia was present. The organic acids were reduced by 76.7% initially, from 17.6 ppm to 4.1 ppm in the permeate. After the carbon bed, 7.5 ppm of organic acids was present.

TABLE 9

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | | | 6.6 | | | 5.2 | |
| Lab pH | units | | | 7.8 | | | 5.8 | |
| Sodium | ppm as Na | | | 0.0 | | | 0.0 | 63% |
| Free Ammonia | ppm as N | | | 92.0 | | | 9.1 | 90% |
| Fixed Organic Ammonia | ppm as N | | | 2.0 | | | 0.0 | 100% |
| Total Ammonia | ppm as N | | | 94.0 | | | 9.1 | 90% |
| Acetic Acid | ppm as $C_2HO_2$ | | | 9.1 | | | 1.8 | 80% |
| Formic Acid | ppm as $CH_2O_2$ | | | 9.2 | | | 1.7 | 82% |
| Pressure | psig | 30.0 | | | 98.0 | 80.0 | | |

Example 10

This example was also conducted to observe the effect of high recovery. The target recovery was 90%. No pH adjustment or carbon bed was included. The degasified process condensate was compared to the RO permeate in Table 10.

The ammonia was removed by 90% from 98 ppm to 9.8 ppm in the permeate. The organic acids were reduced by 70% from 19.2 ppm to 5.7 ppm in the permeate.

TABLE 10

| Parameter | Units | 1. Process Condensate (PC) | 2. Degas PC | 4. pH Adjusted PC | RO Feed | 6. RO Reject | 7. RO Permeate | Percent Rejection |
|---|---|---|---|---|---|---|---|---|
| Field pH | units | 5.4 | 5.8 | 5.8 | | | 4.6 | |
| Lab PH | units | | | 7.0 | | | 6.0 | |
| Sodium | ppm as Na | | | 0.0 | | | 0.0 | 0% |
| Free Ammonia | ppm as N | | | 95.0 | | | 9.8 | 90% |
| Fixed Organic Ammonia | ppm as N | | | 3.0 | | | 0.0 | 100% |
| Total Ammonia | ppm as N | | | 98.0 | | | 9.8 | 90% |
| Acetic Acid | ppm as $C_2HO_2$ | | | 10.4 | | | 3.4 | 67% |
| Formic Acid | ppm as $CH_2O_2$ | | | 8.8 | | | 2.3 | 74% |
| Pressure | psig | 35.0 | | | 126.0 | 113.0 | | |

CONCLUSION

As is shown by Examples 1-10, the RO systems of the present invention are capable of removing contaminants to acceptable levels. This effect may be enhanced by pH adjustment depending on the contaminants that are desired to be removed. For example, organic acid removal is more effective at high pH.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A method of removing contaminants from water comprising the steps of:
   (a) providing a water feed directly downstream of and in-line with process water exposed to hydrocarbon and/or chemical processing by hydrocarbon or chemical processing equipment, wherein said water feed contains a large proportion of contaminants to water, the contaminants including one or more of nitrogen-containing compounds, carbonate, hydrogen sulfide, selenium, other sulfur acids and organic acids resultant from said processing equipment;
   (b) providing a reverse osmosis system in-line with said water feed, said reverse osmosis system capable of withstanding desired process parameters in water feed temperatures up to 185° F. and being directly connected to said water feed, said reverse osmosis system comprising an inlet, at least one reverse osmosis membrane, a permeate outlet, and a reject outlet;

(c) applying pressure or adjusting pressure of said water feed to a degree sufficient to force said water feed through said reverse osmosis system and to effect a reverse osmosis process comprising separating said water feed into permeate and reject which includes at least one of said contaminants;

(d) directing said permeate to said permeate outlet; and (e) directing said reject to said reject outlet.

2. The method of claim 1, wherein said nitrogen-containing compounds are selected from the group consisting of ammonia and amines.

3. The method of claim 2, wherein said permeate comprises a concentration of contaminants from about 80% to about 100% less than said water feed.

4. The method of claim 1, wherein said reverse osmosis membrane comprises a spiral wound thin-film composite membrane.

5. The method of claim 1, wherein said reject comprises a contaminant selected from the group consisting of ammonia and amines.

6. The method of claim 1, further comprising the step of adjusting the pH of said water feed.

7. The method of claim 6, wherein said step of adjusting the pH of said water feed involves setting pH level below 6.5 to remove said nitrogen-containing compounds and group consisting of ammonia and amines.

8. The method of claim 6, wherein said step of adjusting the pH of said water feed involves elevating pH level to increase removal of said acid.

9. The method of claim 6, wherein said adjusting includes (i) the addition of a strong acid, wherein the desired contaminant to be removed is a basic species, or (ii) the addition of a strong base wherein the desired contaminant to be removed is an acidic species.

10. The method of claim 1, further comprising the step of providing a deaerator in-line with said water feed upstream of said reverse osmosis system.

11. The method of claim 10, further comprising the step of adjusting the pH of said water feed upstream of said deaerator.

12. The method of claim 1, further comprising the step of providing at least one pre-treatment system in-line with said water feed upstream of said reverse osmosis system.

13. The method of claim 12, wherein said pre-treatment system comprises filtration selected from the group consisting of nanofiltration, ultrafiltration, microfiltration, and activated carbon filtration.

14. The method of claim 1, wherein said pressure is applied in a range from about 5 psig to about 300 psig.

15. The method of claim 1, wherein said method is conducted in a temperature range from about 125° F. to about 185° F., typical temperature of a sour water stripper water feed.

16. The method of claim 1, further comprising the step of recycling said permeate into said hydrocarbon process.

17. The method of claim 1, further comprising the steps of:

(f) providing a second reverse osmosis system downstream of said permeate outlet of said reverse osmosis system of step (b), said second reverse osmosis system comprising an inlet, at least one reverse osmosis membrane, a permeate outlet, and a reject outlet;

(g) adjusting the pH of said permeate prior to introduction to said permeate to said second reverse osmosis system;

(h) applying pressure or adjusting pressure of said permeate of the reverse osmosis system of step (b) at said inlet of said second reverse osmosis system a degree sufficient to force said permeate of the reverse osmosis system of step (b) through said second reverse osmosis system to effect a second reverse osmosis process separating said permeate of the reverse osmosis system of step (b) into a second permeate and second reject which includes at least one of said contaminants.

18. The method of claim 17, wherein said second reject comprises a contaminant comprising organic acids and sulfur acids.

19. The method of claim 18, further comprising the step of adjusting the pH of at least one of said second permeate or said second reject.

20. The method of claim 1, wherein said hydrocarbon or chemical processing equipment produces said water feed as a process condensate.

21. The method of claim 1, wherein said hydrocarbon or chemical processing equipment utilizes caustic feed mechanism resulting in said water feed.

22. The method of claim 1, wherein said step of applying pressure or adjusting pressure of said water feed forces nitrogen containing contaminants to flow into said reject instead of said permeate.

23. An apparatus for the removal of contaminants from process condensate comprising:

(a) a water feed conduit supplying a water feed directly downstream of and in-line with process water exposed to hydrocarbon and/or chemical processing by hydrocarbon or chemical refining equipment, wherein the contaminants include a large proportion of hydrocarbon in the process condensate resultant from said processing equipment; and (b) a reverse osmosis system comprising an inlet, at least one reverse osmosis membrane, a permeate outlet, and a reject outlet, wherein said reverse osmosis system is capable of separating molecular species in water feed temperatures up to 185° F. and is directly connected to said water feed.

24. The apparatus of claim 23, further comprising:

(c) at least one of the following:

(i) a pump upstream of said reverse osmosis system capable of applying pressure to said water feed to force said water feed through said reverse osmosis system; and (ii) a pressure control device to reduce the pressure of said water feed to an appropriate level to effect a reverse osmosis process.

25. The apparatus of claim 23, further comprising:

(c) a second reverse osmosis system comprising an inlet, at least one reverse osmosis membrane, a permeate outlet, a reject outlet;

said second reverse osmosis system being downstream of said permeate outlet of said reverse osmosis system of step (b) wherein said permeate outlet comprises a second conduit which leads to said inlet of said second reverse osmosis system;

(d) said second conduit including an inlet for injection of a strong base or strong acid;

(e) a second pump upstream of said second reverse osmosis system capable of applying pressure to said permeate of said reverse osmosis system of step (b) to force said permeate through said second reverse osmosis system.

26. The apparatus of claim 23, wherein said water feed conduit further comprises at least one pre-treatment system and a pH adjustment system configured to force nitrogen containing contaminants to flow out as a reject instead of as a permeate.

27. The apparatus of claim 26, wherein said pretreatment system comprises a filter comprising a member selected from the group consisting of a nanofiltration membrane, an ultrafiltration membrane, a microfiltration membrane and activated carbon filter.

28. A method for the removal of contaminants from water comprising the steps of:
(a) providing a water feed directly downstream of and in-line with process water exposed to hydrocarbon and/or chemical processing by hydrocarbon or chemical processing equipment, wherein said water feed contains a large proportion of contaminants to water, the contaminants including one or more of nitrogen-containing compounds, carbonate, hydrogen sulfide, selenium, other sulfur acids and organic acids resultant from said processing equipment;
(b) providing a first reverse osmosis system in-line with said water feed, said first reverse osmosis system capable of withstanding desired process parameters of water temperatures up to 185° F. and being directly connected to said water feed, said reverse osmosis system comprising a first inlet, at least one reverse osmosis membrane, a first permeate outlet, and a first reject outlet;
(c) applying pressure or adjusting pressure of said water feed to a degree sufficient to force said water feed through said first reverse osmosis system and to effect a reverse osmosis process comprising separating said water feed into a first permeate and a first reject which includes at least one of said contaminants;
(d) directing said first permeate to said first permeate outlet;
(e) directing said first reject to said first reject outlet;
(f) providing a second reverse osmosis system downstream of said first permeate outlet, said second reverse osmosis system comprising a second inlet, at least one reverse osmosis membrane, a second permeate outlet, and a second reject outlet, wherein said first permeate outlet feeds into said second inlet;
(g) adjusting the pH of said first permeate prior to introduction of said first permeate to said second reverse osmosis system; and
(h) applying pressure or adjusting pressure of said first permeate at said inlet of said second reverse osmosis system a degree sufficient to force said first permeate through said second reverse osmosis system to effect a second reverse osmosis process separating said first permeate into a second permeate and second reject which includes at least one of said contaminants.

29. The method of claim 28, wherein said adjusting the pH of step (g) comprises providing a break tank for said first permeate to control pressure and pH addition prior to introduction to said second reverse osmosis system.

30. The method of claim 28, further comprising the step of providing a break tank upstream of said first reverse osmosis system to adjust the pH of said water feed and to release dissolved gas from within said water feed.

31. The method of claim 28, wherein said first reject comprises at least one of ammonia and amines and said second reject includes organic acids and sulfur acids.

32. The method of claim 28, further comprising the step of providing at least one pre-treatment system upstream of said first osmosis system.

33. A method of removing contaminants from water through a multi-stage reverse osmosis process comprising the following steps:
(a) completing the following steps of stage one:
(i) providing a water feed directly downstream of and in-line with process water exposed to hydrocarbon and/or chemical processing by hydrocarbon or chemical processing equipment, wherein said water feed contains a large proportion of contaminants to water, the contaminants including one or more of nitrogen-containing compounds, carbonate, hydrogen sulfide, selenium, other sulfur acids and organic acids resultant from said processing equipment;
(ii) providing a stage one reverse osmosis system capable of separating molecular species in water temperatures up to 185° F. and being directly in-line with said water feed, said stage one reverse osmosis system comprising a stage one inlet, at least one reverse osmosis membrane, a stage one permeate outlet, and a stage one reject outlet;
(iii) applying pressure or adjusting pressure of said water feed to a degree sufficient to force said water feed through said stage one reverse osmosis system and to effect a reverse osmosis process comprising separating said water feed into a stage one permeate and a stage one reject which includes at least one of said contaminants;
(iv) directing said stage one permeate to said stage one permeate outlet; and
(v) directing said stage one reject to said reject one outlet; and
(b) completing at least one additional reverse osmosis process wherein a reject from a previous step is introduced to a reverse osmosis system of an immediately following subsequent step; said additional reverse osmosis process comprising the following steps:
(i) providing a stage two reverse osmosis system downstream of said stage one reject outlet, said stage two reverse osmosis system comprising a stage two inlet, at least one reverse osmosis membrane, a stage two permeate outlet, and a stage two reject outlet; wherein said stage one reject outlet feeds into said stage two inlet;
(ii) applying pressure or adjusting pressure of said stage one reject at said inlet of said stage two reverse osmosis system to a degree sufficient to force said stage one reject through said stage two reverse osmosis system to effect a second reverse osmosis process separating said stage one reject into a stage two permeate and a stage two reject which includes at least one of said contaminants; and
(c) combining said stage one permeate and said stage two permeate.

* * * * *

UNITED STATES PATENT AND TRADEMARK OFFICE
CERTIFICATE OF CORRECTION

PATENT NO. : 7,306,735 B2  
APPLICATION NO. : 10/661221  
DATED : December 11, 2007  
INVENTOR(S) : Baggott et al.

Page 1 of 1

It is certified that error appears in the above-identified patent and that said Letters Patent is hereby corrected as shown below:

At column 4, line 55, the printed patent incorrectly reads "present invention, The permeate, directed"; the patent should read --present invention, the permeate, directed--.

At column 8, line 1, the printed patent incorrectly reads "by means of a any filter known"; the patent should read --by means of any filter known--.

At column 10, line 21, the printed patent incorrectly reads "did achieve an enhance removal"; the patent should read --did achieve and enhance removal--.

At column 11, line 33, the printed patent incorrectly reads "Specifically, The combined free"; the patent should read --Specifically, the combined free--.

At column 13, line 35, the printed patent incorrectly reads "Ammonida was removed"; the patent should read --Ammonia was removed--.

Signed and Sealed this

Twenty-ninth Day of April, 2008

JON W. DUDAS  
*Director of the United States Patent and Trademark Office*